United States Patent
Tay et al.

(10) Patent No.: US 10,059,294 B1
(45) Date of Patent: Aug. 28, 2018

(54) CRUSHABLE ARMREST ASSEMBLY FOR SIDE IMPACT AND STRUCTURAL PERFORMANCE

(71) Applicant: Ford Global Technologies, LLC, Dearborn, MI (US)

(72) Inventors: Yi Yang Tay, Plymouth, MI (US); Hui Wang, Novi, MI (US); Li Lu, Bloomfield Hills, MI (US); Linh Doan, Belleville, MI (US); Bhavani Thota, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/622,351

(22) Filed: Jun. 14, 2017

(51) Int. Cl.
| | |
|---|---|
| *B60R 21/04* | (2006.01) |
| *B60J 5/04* | (2006.01) |
| *B60R 13/02* | (2006.01) |
| *B60N 2/46* | (2006.01) |
| *B60N 2/75* | (2018.01) |

(52) U.S. Cl.
CPC ........ *B60R 21/0428* (2013.01); *B60J 5/0413* (2013.01); *B60N 2/466* (2013.01); *B60N 2/78* (2018.02); *B60R 13/0243* (2013.01); *B60R 2013/0287* (2013.01); *B60Y 2410/123* (2013.01)

(58) Field of Classification Search
CPC . B60R 21/0428; B60R 13/0243; B60N 2/466; B60J 5/0413
USPC ............................................ 296/153, 187.12
See application file for complete search history.

(56) References Cited

U.S. PATENT DOCUMENTS

| | | | |
|---|---|---|---|
| 7,121,611 B2 * | 10/2006 | Hirotani | ................. B60J 5/0451 296/153 |
| 7,775,584 B2 | 8/2010 | Hughes, Jr. et al. | |
| 8,506,003 B2 | 8/2013 | Smith et al. | |
| 9,452,596 B2 | 9/2016 | Suzuki et al. | |
| 9,505,325 B2 | 11/2016 | Doan et al. | |
| 2007/0069548 A1 | 3/2007 | Dooley et al. | |
| 2011/0254311 A1 | 10/2011 | Dajek et al. | |
| 2016/0129813 A1* | 5/2016 | Darling | ................ B60N 2/4673 296/1.09 |
| 2016/0257226 A1 | 9/2016 | Quinlan | |

* cited by examiner

*Primary Examiner* — Joseph Pape
(74) *Attorney, Agent, or Firm* — Frank A. MacKenzie; Bejin Bieneman PLC

(57) ABSTRACT

An assembly includes a door trim panel, and an armrest assembly supported by the door trim panel. The armrest assembly includes a crushable member. The crushable member includes a substrate defining a gap extending through the substrate. The crushable member includes a plug disposed in the gap and fixed to the substrate on a perimeter of the gap. The substrate is rigid relative to the plug.

20 Claims, 7 Drawing Sheets

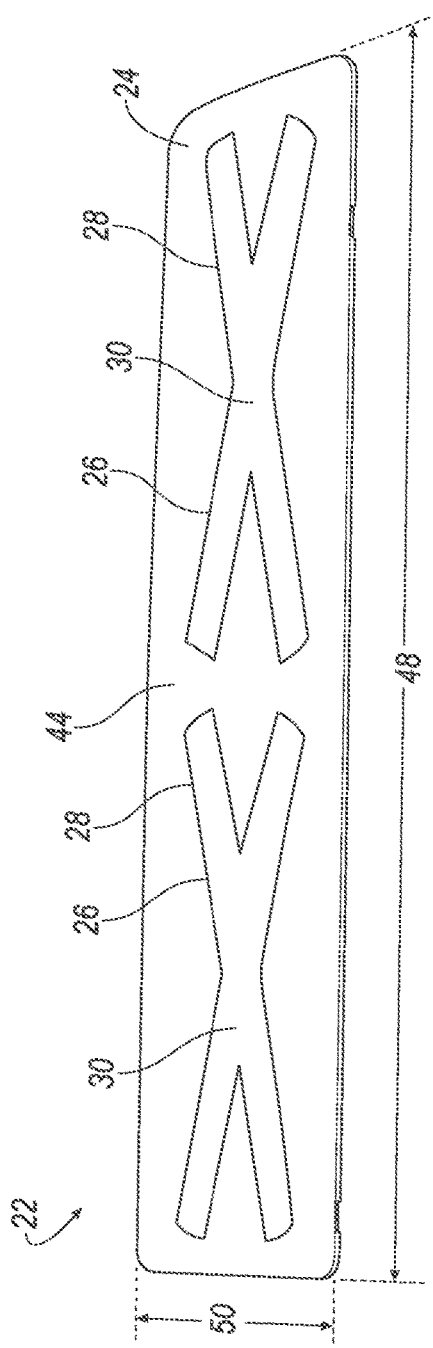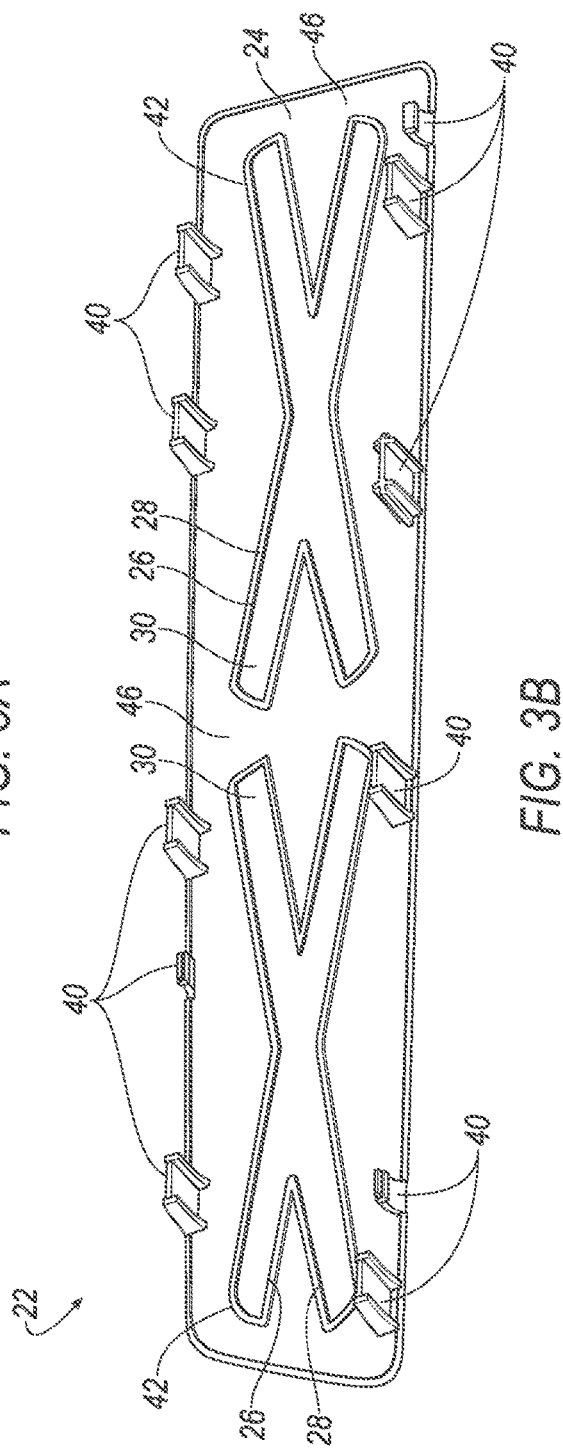

CRUSHABLE ARMREST ASSEMBLY FOR SIDE IMPACT AND STRUCTURAL PERFORMANCE

BACKGROUND

The Insurance Institute for Highway Safety (IIHS) has standardized a side impact crash test in which a stationary test vehicle is struck on the driver side by a crash cart fitted with a 1,500 kg moving deformable barrier (MBD). The MBD has an impact velocity of 50 km/h (31.1 mi/h) and strikes the vehicle on the driver side at a 90 degree angle. In a similar test, the National Highway Traffic Safety Administration (NHTSA) has developed a New Car Assessment Program (NCAP) side impact crash test in which the MBD has a mass of 1,361 kg and an impact velocity of 61.9 km/h.

A vehicle may include a door, and the door may include an armrest assembly. At least a portion of the armrest assembly may crush in response to a force, such as the IIHS side impact crash test, the NHTSA NCAP side impact crash test, etc.

BRIEF DESCRIPTION OF THE DRAWINGS

FIG. 3A is a top perspective view of a crushable member of the armrest assembly.

FIG. 3B is a bottom perspective view of the crushable member of the armrest assembly.

DETAILED DESCRIPTION

Figure 1:
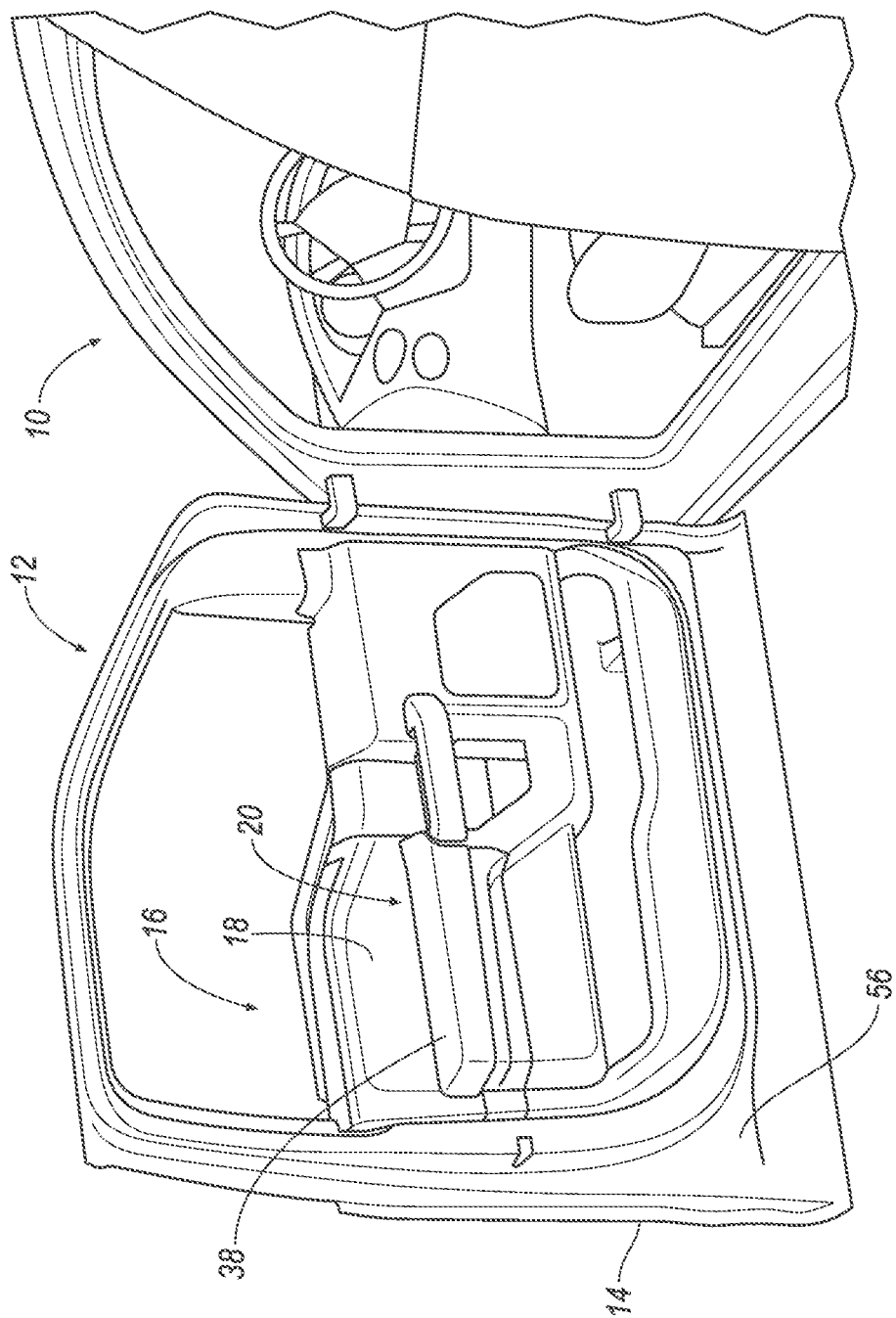
FIG. 1 is a perspective view of a vehicle including a door in an open position.

An assembly includes a door trim panel, and an armrest assembly supported by the door trim panel. The armrest assembly includes a crushable member. The crushable member includes a substrate defining a gap extending through the substrate. The crushable member includes a plug disposed in the gap and fixed to the substrate on a perimeter of the gap. The substrate is rigid relative to the plug.

The plug may be continuously fixed to the substrate on an entire perimeter of the gap.

The gap may be X-shaped.

The armrest assembly may include a main carrier fixed to the door trim panel, and the crushable member may be supported by the main carrier.

One of the main carrier and the substrate may have a tab receptacle, and the other of the main carrier and the substrate may have an engagement tab engaged with the tab receptacle.

The armrest assembly may include a foam pad supported by the crushable member and a cover covering the main carrier, the crushable member, and the foam pad.

The substrate may include a ridge along the perimeter of the gap.

The plug may be overmolded to the substrate.

The plug may completely fill the gap.

The substrate may have a top surface and a bottom surface opposite the top surface, and the plug may extend from the top surface to the bottom surface.

The crushable member may extend from the door trim panel transversely to the door trim panel, and the crushable member may be designed to crush toward the door trim panel.

The substrate may be formed of plastic and the plug may be formed of an elastomer.

An armrest assembly includes a main carrier having a tab receptacle. A crushable member includes a substrate defining a gap extending through the substrate and the substrate has an engagement tab engaged with the tab receptacle. The crushable member includes a plug disposed in the gap and fixed to the substrate on a perimeter of the gap. The substrate is rigid relative to the plug. A foam pad is supported by the crushable member.

The gap may be X-shaped.

The substrate may include a ridge along the perimeter of the gap.

The plug may completely fill the gap.

The substrate may have a top surface and a bottom surface opposite the top surface, and the plug may extend from the top surface to the bottom surface.

The substrate may be formed of plastic and the plug may be formed of an elastomer.

The plug may be continuously fixed to the substrate on an entire perimeter of the gap.

The substrate may have a length, a width, and a height. The length may be greater than the width and the width may be greater than the height. The crushable member may be designed to crush in a direction generally parallel to the width of the substrate.

With reference to the Figures, wherein like numerals indicate like parts throughout the several views, an assembly 16 is generally shown. The assembly 16 includes a door trim panel 18, and an armrest assembly 20 supported by the door trim panel 18. The armrest assembly 20 includes a crushable member 22. The crushable member 22 includes a substrate 24 defining a gap 26 extending through the substrate 24. The crushable member 22 includes a plug 30 disposed in the gap 26 and fixed to the substrate 24 on a perimeter 28 of the gap 26. The substrate 24 is rigid relative to the plug 30.

By having the plug 30 disposed in the gap 26 of the substrate 24, the crushable member 22 may improve lateral crush in tests such as the IIHS side impact crash test, the NHTSA NCAP side impact crash test, or any suitable test.

With reference to FIG. 1, a vehicle 10 includes a door 12. While the door 12 is shown as a driver side door in FIG. 1, the door 12 may be any suitable door, such as a passenger side door, a rear door, etc. The door 12 includes a door outer 14, a door inner 56, and the assembly 16. The door outer 14 may be fixed to the door inner 56 by flanging, welding, or in any other suitable fashion.

The door outer 14 and the door inner 56 may be formed of metal (e.g., aluminum, steel, etc.), composite material e.g., fiber reinforced thermoplastic, sheet molding compound (SMC), etc., or any suitable material. The door outer 14 may have a class-A surface facing exteriorly, i.e., a surface specifically manufactured to have a high-quality, finished aesthetic appearance free of blemishes.

The door trim panel 18 of the assembly 16 is fixed to the door inner 56 in any suitable way, e.g., threaded fasteners, clips, push-pins, Christmas tree fasteners, etc. The door trim panel 18 may be formed of plastic, foam, leather, vinyl, etc. and combinations thereof. The door trim panel 18 may have a class-A surface facing the passenger cabin, i.e., a surface specifically manufactured to have a high-quality, finished aesthetic appearance free of blemishes.

Figure 2:
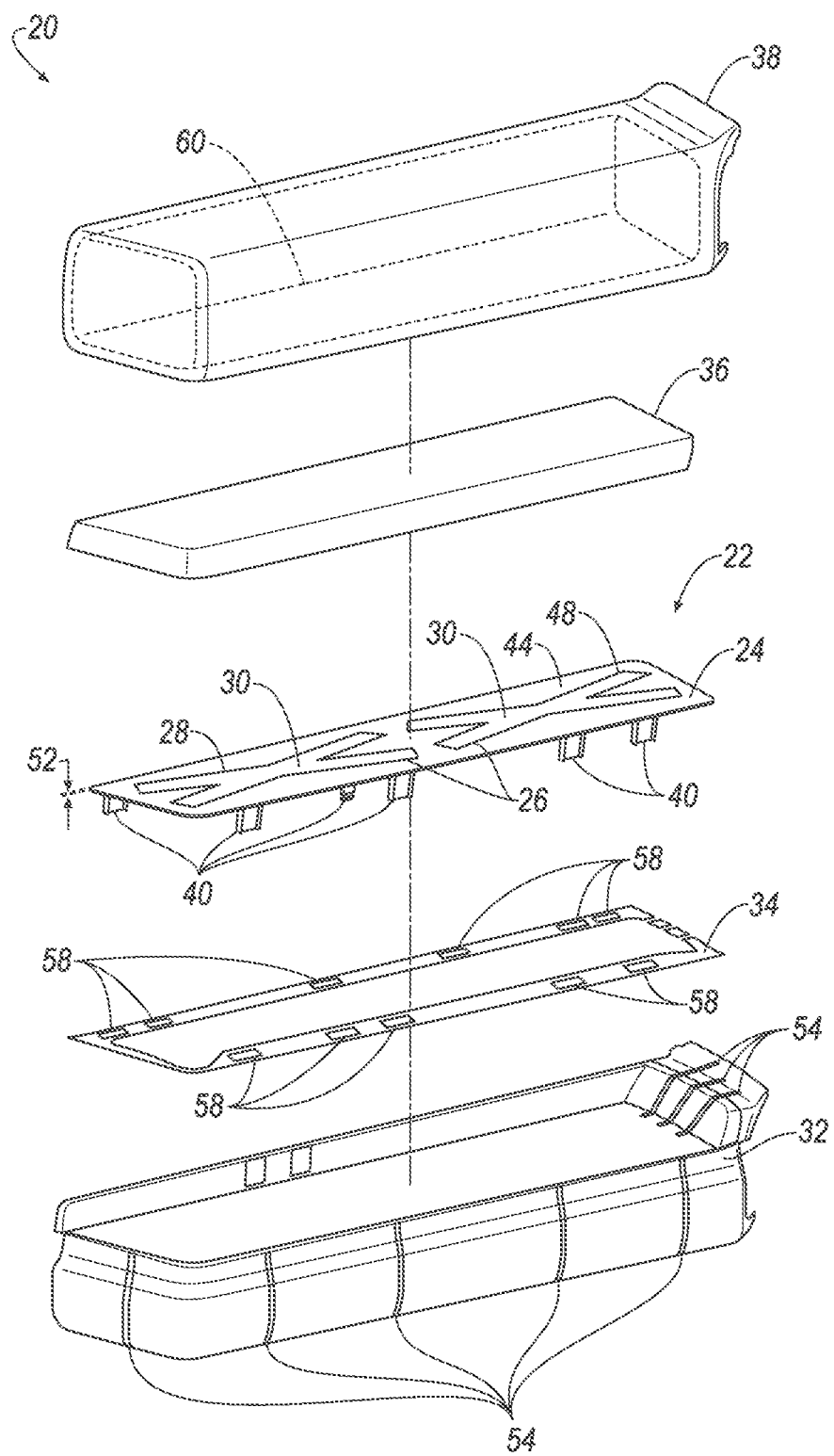
FIG. 2 is an exploded view of an armrest assembly of the door.

With reference to FIGS. 1 and 2, the assembly 16 includes the armrest assembly 20 supported by the door trim panel 18. For example, the armrest assembly 20 may include a main carrier 32 fixed to the door trim panel 18. The main carrier 32 may be fixed to the door trim panel 18 in any suitable way. e.g., threaded fasteners, heat stakes, welding, etc. As another example, the main carrier 32 may be integrally formed with the door trim panel 18, i.e., the main carrier 32 and the door trim panel 18 may be a single, unitary member. The main carrier 32 may be formed of plastic. Acrylonitrile Butadiene Styrene (ABS), Polyphenylene Ether (PPE), or any suitable material. The main carrier 32 may be generally hollow as shown in FIG. 2, or the main carrier 32 may be filled with any suitable material.

The main carrier 32 may include strips 54 extending along the main carrier 32. For example, as shown in FIG. 2, the main carrier 32 may include eight strips 54, or any suitable number of strips 54. The strips 54 may extend in a generally vertical direction, or any suitable direction. The strips 54 may be designed to tune an energy absorption characteristic of the armrest assembly 20. The strips 54 may be formed of plastic, rubber, etc., or any suitable material.

One of the main carrier 32 and the substrate 24 may have a tab receptacle 34, and the other of the main carrier 32 and the substrate 24 may have an engagement tab 40 engaged with the tab receptacle 34. For example, the main carrier 32 may have the tab receptacle 34 and the substrate 24 may have the engagement tab 40 engaged with the tab receptacle 34. As another example, the substrate 24 may have the tab receptacle 34 and the main carrier 32 may have the engagement tab 40 engaged with the tab receptacle 34. The tab receptacle 34 may be supported by one of the main carrier 32 and the substrate 24 in any suitable way, e.g., threaded fasteners, heat stakes, welding, contact, etc. As another example, the tab receptacle 34 may be integrally formed with one of the main carrier 32 and the substrate 24, i.e., the tab receptacle 34 and one of the main carrier 32 and the substrate 24 may be a single, unitary member.

With reference to FIGS. 1-2, the armrest assembly 20 may include a foam pad 36 supported by the crushable member 22 and a cover 38 covering the main carrier 32, the crushable member 22, and the foam pad 36. For example, the cover 38 may be generally hollow and may define a cavity 60. The cavity 60 may receive the main carrier 32, the crushable member 22, and the foam pad 36. The foam pad 36 may have a generally rectangular cross-section and may be formed of foam, rubber, etc., or any suitable material. The foam pad 36 may be supported by the crushable member 22 in any suitable way. e.g., sewing, welding, friction, etc. The cover 38 may have a shape that generally corresponds to a shape of the main carrier 32. The cover 38 may be formed of plastic, foam, leather, vinyl, etc. or any suitable material. The cover 38 may be fixed to one of the main carrier 32, the crushable member 22, and the foam pad 36 in any suitable way. e.g., sewing, welding, threaded fasteners, etc. For purposes of clarity. FIGS. 4-7 are shown without the foam pad 36 and the cover 38, however, it is to be understood that the foam pad 36 and the cover 38 may be included in the armrest assembly 20.

With reference to FIGS. 2-3B, the armrest assembly 20 includes the crushable member 22. The crushable member 22 may be supported by the main carrier 32. The crushable member 22 may be supported by the main carrier 32 in any suitable way, threaded fasteners, heat stakes, welding, etc. As another example, the crushable member 22 may be integrally formed with the main carrier 32. i.e., the crushable member 22 and the main carrier 32 may be a single, unitary member. As yet another example, the main carrier 32 may include the tab receptacle 34 and the substrate 24 of the crushable member 22 may include the engagement tab 40 engaged with the tab receptacle 34.

Figure 5:
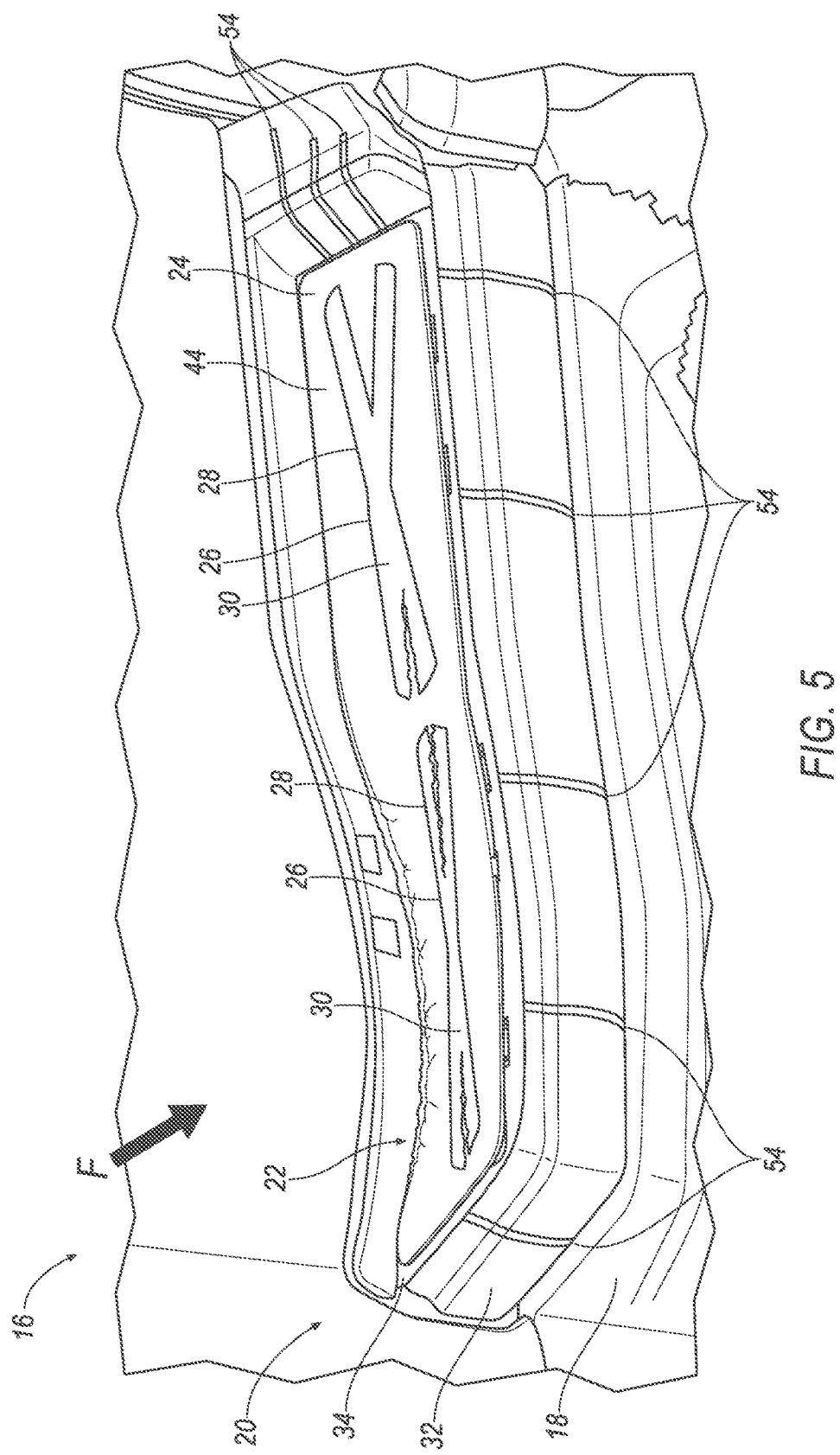
FIG. 5 is a perspective view of the armrest assembly of FIG. 4 in response to a force.

The crushable member 22 may extend from the door trim panel 18 transversely to the door trim panel 18, and the crushable member 22 may be designed to crush toward the door trim panel 18. For example, when the door 12 is fixed to the vehicle 10 and the door trim panel 18 is fixed to the door 12, the door trim panel 18 may extend in a generally vertical direction. In this orientation, the crushable member 22 may extend from the door trim panel 18 in a generally horizontal direction, and the crushable member 22 may crush toward the door trim panel 18 in a generally horizontal direction. As shown in FIG. 5, the crushable member 22 may crush in response to a force F. The force F may result from a vehicle side impact, the IIHS side impact crash test, the NHTSA NCAP side impact crash test, etc., or any suitable force.

The crushable member 22 includes the substrate 24. The substrate 24 may have a top surface 44 and a bottom surface 46 opposite the top surface 44. The top surface 44 and the bottom surface 46 may be generally flat or any other suitable configuration. The engagement tab 40 may be disposed on the bottom surface 46 of the substrate 24. As shown in FIG. 3B, there may be eleven engagement tabs 40, or any suitable number of engagement tabs 40. The tab receptacle 34 may have a hole 58 corresponding to each engagement tab 40, and each engagement tab 40 may be engaged with each hole 58 such that the substrate 24 is connected to the tab receptacle 34.

The substrate 24 may have a generally rectangular cross-section, or any suitable cross-section. For example, the substrate 24 may have a length 48, a width 50, and a height 52. The length 48 may be greater than the width 50 and the width 50 may be greater than the height 52. The length 48 and the width 50 may define the top surface 44 and the bottom surface 46. The crushable member 22 may be designed to crush in a direction generally parallel to the width 50 of the substrate 24. For example, the crushable member 22 may crush generally toward the door trim panel 18. The substrate 24 may be formed of plastic, ABS, PPE, etc., or any suitable material.

Figure 4:
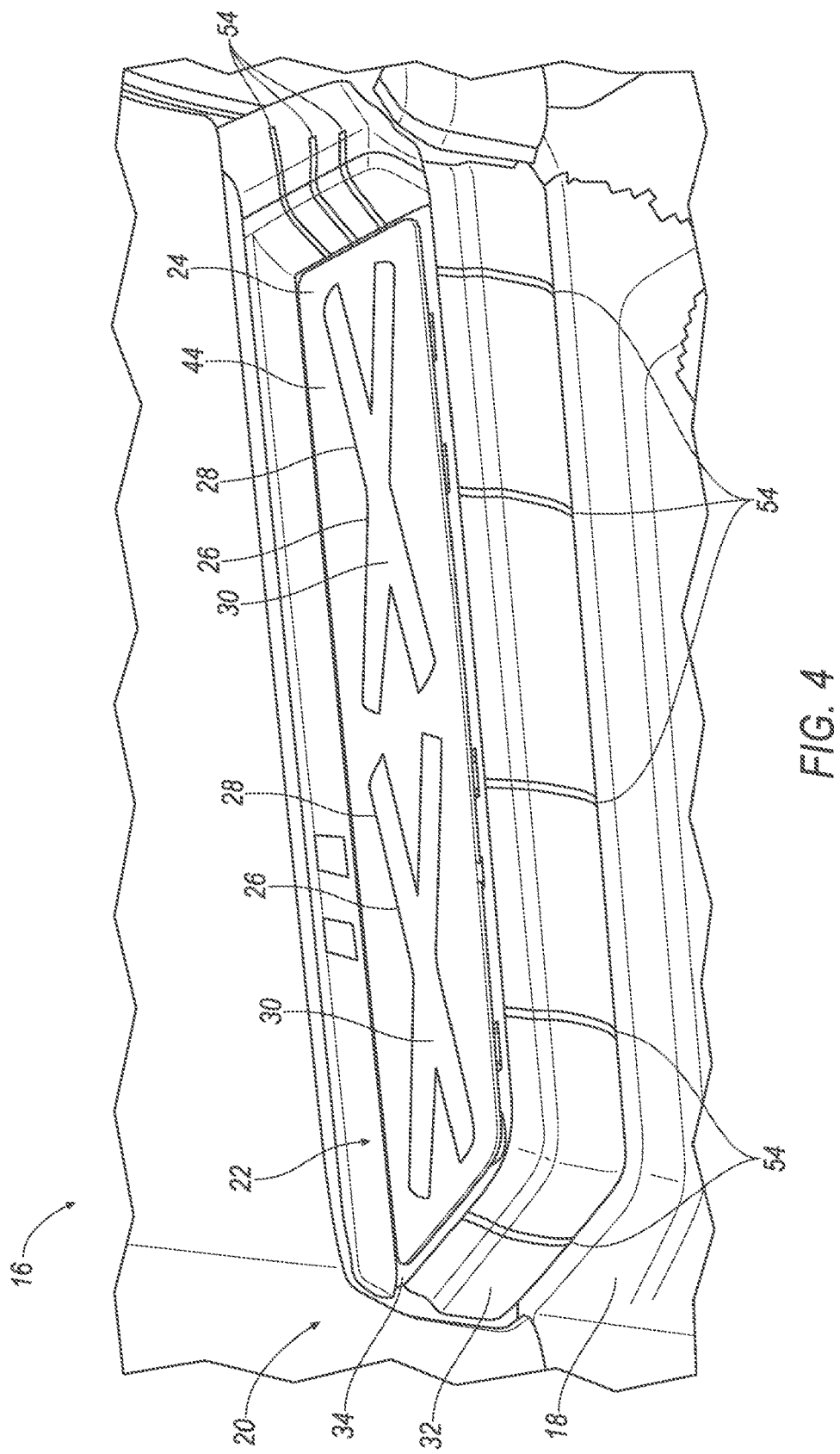
FIG. 4 is a perspective view of one embodiment of the armrest assembly.
Figure 6:
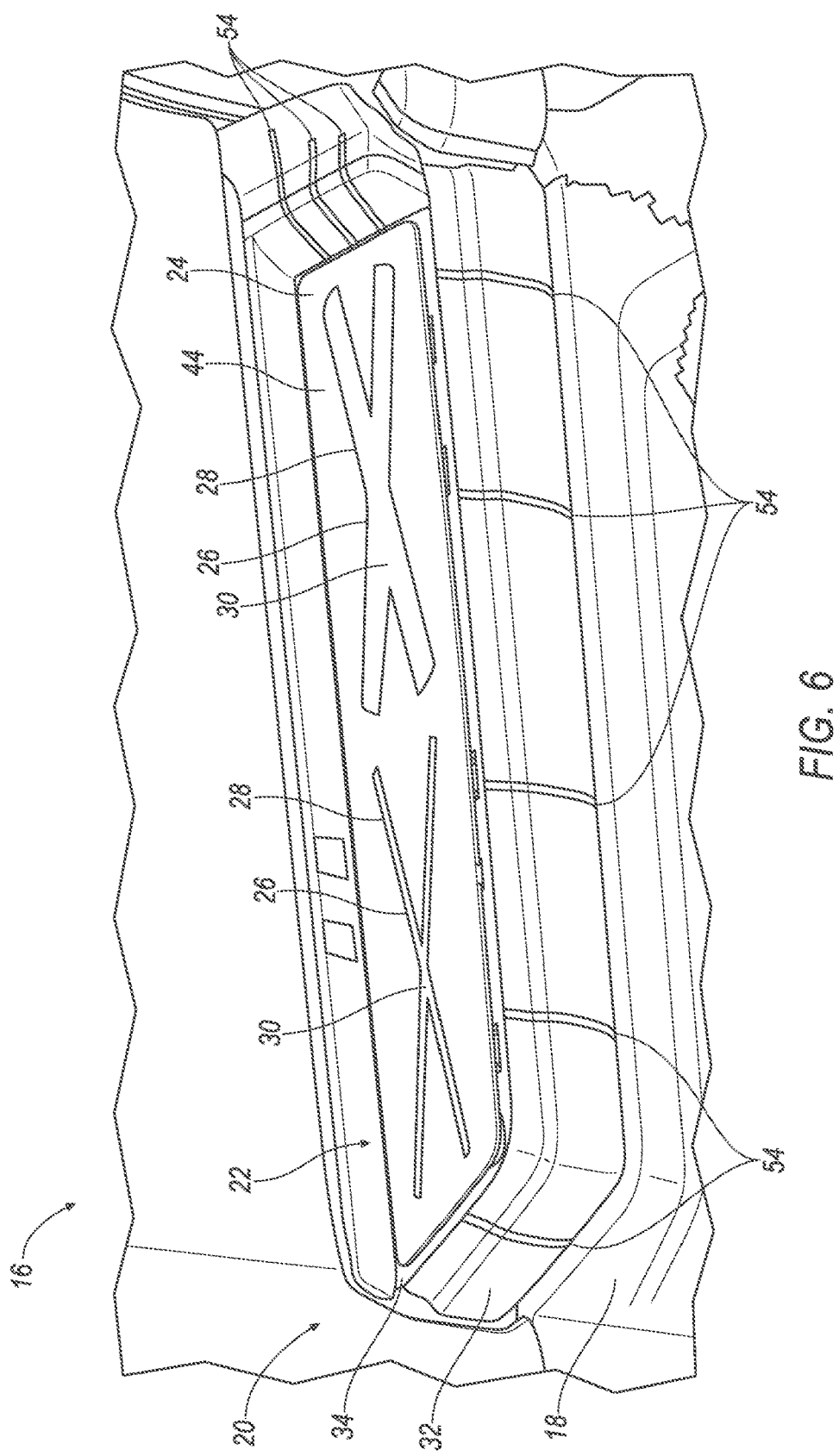
FIG. 6 is a perspective view of another embodiment of the armrest assembly.
Figure 7:
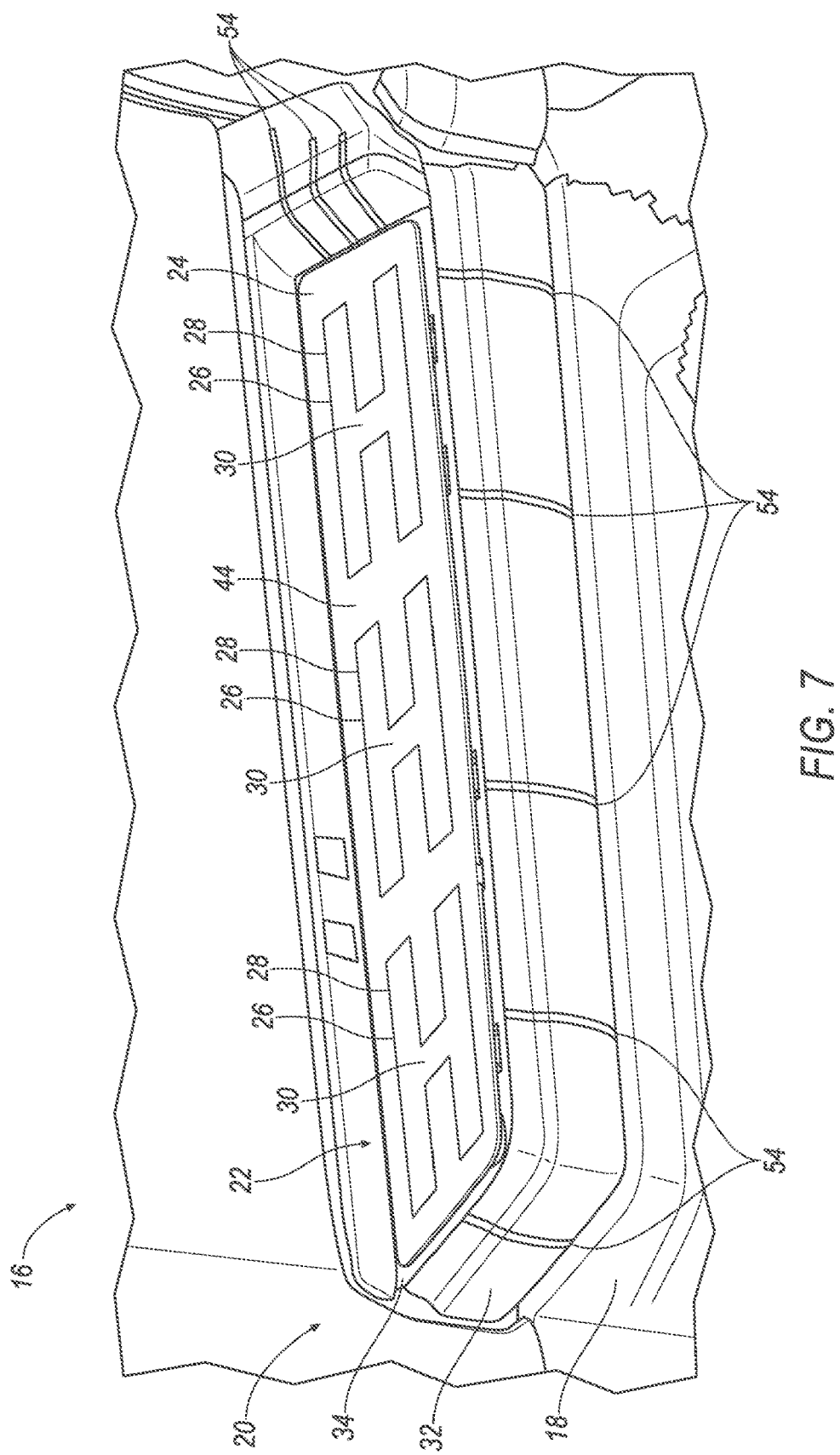
FIG. 7 is a perspective view of another embodiment of the armrest assembly.

As set forth above, the substrate 24 defines the gap 26 extending through the substrate 24. The gap 26 may extend from the top surface 44 of the substrate 24 to the bottom surface 46 of the substrate 24. e.g., the gap 26 may extend along the entire height 52 of the substrate 24. The gap 26 may be X-shaped. e.g., the X-shape may be generally parallel to the top surface 44 (FIG. 3A) and the bottom surface 46 (FIG. 3B). As another example, the gap 26 may be any suitable shape, such as H-shaped (FIG. 7), U-shaped, etc. As shown in FIGS. 2-6, the substrate 24 may define two gaps 26 extending through the substrate 24. Alternatively, there may be any suitable number of gaps 26, e.g., three gaps 26 as shown in FIG. 7. As shown in FIG. 4, the gaps 26 may be generally the same size and shape. As another example, as shown in FIG. 6, one of the gaps 26 may be a different size than the other of the gaps 26. As yet another example, one of the gaps 26 may be a different shape than the other of the gaps 26. The size, shape, and number of gaps 26 may be any suitable combination of the above examples.

With reference to FIG. 3B, the substrate 24 may include a ridge 42 along the perimeter 28 of the gap 26. The ridge 42 may be disposed on the bottom surface 46 of the substrate 24 as shown in FIG. 3B. As another example, the ridge 42 may be disposed on the top surface 44 of the substrate 24. The ridge 42 may extend transversely from one of the bottom surface 46 and the top surface 44. The ridge 42 may completely surround the gap 26. i.e., the ridge 42 may extend continuously along the entire perimeter 28 of the gap 26. As another example, the ridge 42 may extend along only a portion of the perimeter 28 of the gap 26.

With reference to FIGS. 2-7, the crushable member 22 includes the plug 30 disposed in the gap 26 and fixed to the substrate 24 on the perimeter 28 of the gap 26. The perimeter 28 of the gap 26 is disposed between the top surface 44 of the substrate 24 and the bottom surface 46 of the substrate 24. The plug 30 may be fixed to the substrate 24 in any suitable way. e.g., adhesive, welding, etc. As another example, the plug 30 may be overmolded to the substrate 24, e.g., the plug 30 may be injected into the gap 26 and cured such that the substrate 24 and the plug 30 are a single, unitary member. The plug 30 may be formed of an elastomer, plastic, Thermoplastic Elastomer (TPE), Thermoplastic Olefin (TPO), Thermoplastic Polyurethane (TPU), Polyvinyl Chloride (PVC), Polyvinylpyrrolidone (PVO), Polyphenylene Oxide (PPO), Polyurethane (PU), etc., or any suitable material. The plugs 30 may be formed of the same material. As another example, one of the plugs 30 may have a material different than a material of the other of the plugs 30. The plug 30 may be X-shaped, e.g., the X-shape may be generally parallel to the top surface 44 (FIG. 3A) and the bottom surface 46 (FIG. 3B). As another example, the plug 30 may be any suitable shape, such as H-shaped (FIG. 7). U-shaped, etc.

The plug 30 may correspond to each gap 26. For example, as shown in FIGS. 2-6, there may be two gaps 26 and two plugs 30. As another example, there may be any suitable number of plugs 30, e.g., three plugs 30 as shown in FIG. 7. As another example, the number of plugs 30 may be different than the number of gaps 26, e.g., there may be two gaps 26 and one plug 30 disposed in only one of the gaps 26. As shown in FIG. 4, the plugs 30 may be generally the same size and shape. As another example, as shown in FIG. 6, one of the plugs 30 may be a different size than the other of the plugs 30. As yet another example, one of the plugs 30 may be a different shape than the other of the plugs 30. The size, shape, material, and number of plugs 30 may be any suitable combination of the above examples.

The plug 30 may be continuously fixed to the substrate 24 on the entire perimeter 28 of the gap 26. For example, at every point on the perimeter 28, the plug 30 may be fixed to the substrate 24. As another example, the plug 30 may be fixed to the substrate 24 on only a portion of the perimeter 28. As yet another example, the plug 30 may be disposed in the gap 26 and disconnected from the perimeter 28, i.e., the plug 30 may not contact the perimeter 28.

The plug 30 may completely fill the gap 26. For example, a volume of the gap 26 and a volume of the plug 30 may both be defined by the top surface 44, the bottom surface 46 and the perimeter 28. The plug 30 may extend from the top surface 44 to the bottom surface 46, i.e., the plug 30 may have a height equal to the height 52 of the substrate 24. For example, the plug 30 may be generally flush with the top surface 44 and the bottom surface 46. As another example, the plug 30 may be below the top surface 44 and/or the bottom surface 46, i.e., the plug 30 may have a height less than the height 52 of the substrate 24. As yet another example, the plug 30 may extend beyond the top surface 44 and/or the bottom surface 46. i.e., the plug 30 may have a height greater than the height 52 of the substrate 24.

The substrate 24 is rigid relative to the plug 30. For example, the substrate 24 and the plug 30 may each have a stiffness, each stiffness being determined by at least material, thickness, density, etc. The stiffness of the substrate 24 may be greater than the stiffness of the plug 30. As one example, the substrate 24 and the plug 30 may be formed of different materials having different stiffnesses. As another example, the substrate 24 and the plug 30 may be formed of the same material having different stiffnesses. The substrate 24 may be formed of a material having generally plastic properties, and the plug 30 may be formed of a material having generally elastic properties.

With reference to FIG. 5, the crushable member 22 may crush in response to the force F. For example, the substrate 24 may crush in response to the force F and the plug 30 may absorb a portion of the force F. The crushable member 22, including the substrate 24, the gap 26, the plug 30, etc., may be designed to meet standards of tests such as the IIHS side impact crash test, the NHTSA NCAP side impact crash test, or any suitable test. For example, the force F shown in FIG. 5 may represent a force applied during the NHTSA NCAP side impact crash test, and, based on a location of the force F, one of the plugs 30 may absorb more of the force F than the other of the plugs 30. As another example, such as in the IIHS side impact crash test, the location of the force F may be different than as shown in FIG. 5, and one of the plugs 30 that may absorb more of the force F than the other of the plugs 30 may be different than one of the plugs 30 that may absorb more of the force F than the other of the plugs 30 in the NHTSA NCAP side impact crash test. As another example, one of the plugs 30 may absorb the same amount of the force F as the other of the plugs 30.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a door trim panel; and
an armrest assembly supported by the door trim panel, the armrest assembly including a crushable member;
the crushable member including a substrate defining a gap extending through the substrate, and the crushable member including a plug disposed in the gap and fixed to the substrate on a perimeter of the gap, the substrate being rigid relative to the plug; and
wherein the plug is overmolded to the substrate.

2. The assembly of claim 1, wherein the plug is continuously fixed to the substrate on an entire perimeter of the gap.

3. The assembly of claim 1, wherein the gap is X-shaped.

4. The assembly of claim 1, wherein the armrest assembly includes a main carrier fixed to the door trim panel, and the crushable member is supported by the main carrier.

5. The assembly of claim 4, wherein one of the main carrier and the substrate has a tab receptacle, and the other of the main carrier and the substrate has an engagement tab engaged with the tab receptacle.

6. The assembly of claim 4, wherein the armrest assembly includes a foam pad supported by the crushable member and a cover covering the main carrier, the crushable member, and the foam pad.

7. The assembly of claim 1, wherein the substrate includes a ridge along the perimeter of the gap.

8. The assembly of claim 1, wherein the plug completely fills the gap.

9. The assembly of claim 8, wherein the substrate has a top surface and a bottom surface opposite the top surface, and the plug extends from the top surface to the bottom surface.

10. The assembly of claim 1, wherein the crushable member extends from the door trim panel transversely to the door trim panel, and wherein the crushable member is designed to crush toward the door trim panel.

11. The assembly of claim 1, wherein the substrate is formed of plastic and the plug is formed of an elastomer.

12. An armrest assembly comprising:
a main carrier having a tab receptacle;
a crushable member including a substrate defining a gap extending through the substrate and the substrate having an engagement tab engaged with the tab receptacle, and the crushable member including a plug disposed in the gap and fixed to the substrate on a perimeter of the gap, the substrate being rigid relative to the plug; and
a foam pad supported by the crushable member; and
wherein the plug completely fills the gap.

13. The armrest assembly of claim 12, wherein the gap is X-shaped.

14. The armrest assembly of claim 12, wherein the substrate includes a ridge along the perimeter of the gap.

15. The armrest assembly of claim 12, wherein the substrate has a top surface and a bottom surface opposite the top surface, and the plug extends from the top surface to the bottom surface.

16. The armrest assembly of claim 12, wherein the substrate is formed of plastic and the plug is formed of an elastomer.

17. The armrest assembly of claim 12, wherein the plug is continuously fixed to the substrate on an entire perimeter of the gap.

18. The armrest assembly of claim 12, wherein the substrate has a length, a width, and a height, the length being greater than the width and the width being greater than the height, and wherein the crushable member is designed to crush in a direction generally parallel to the width of the substrate.

19. An armrest assembly comprising:
a main carrier having a tab receptacle;
a crushable member including a substrate defining a gap extending through the substrate and the substrate having an engagement tab engaged with the tab receptacle, and the crushable member including a plug disposed in the gap and fixed to the substrate on a perimeter of the gap, the substrate being rigid relative to the plug; and
a foam pad supported by the crushable member; and
wherein the plug is continuously fixed to the substrate on an entire perimeter of the gap.

20. An armrest assembly comprising:
a main carrier having a tab receptacle;
a crushable member including a substrate defining a gap extending through the substrate and the substrate having an engagement tab engaged with the tab receptacle, and the crushable member including a plug disposed in the gap and fixed to the substrate on a perimeter of the gap, the substrate being rigid relative to the plug; and
a foam pad supported by the crushable member; and
wherein the gap is X-shaped.

* * * * *